Nov. 15, 1960  F. HOLPER  2,960,190
MOTOR BRAKE
Filed Feb. 24, 1959

INVENTOR.
Frank Holper
BY
Calford Livingston
ATTORNEY

United States Patent Office 2,960,190
Patented Nov. 15, 1960

2,960,190

MOTOR BRAKE

Frank Holper, Broadview, Ill., assignor to Molon Motor & Coil Corp., Chicago, Ill., a corporation of Illinois Filed Feb. 24, 1959, Ser. No. 795,198

5 Claims. (Cl. 188—1)

The present disclosures relate to brakes and brake materials generally, and particularly to combinations of certain materials used as braking couples or interfaces on coacting brake members for producing a maximum or optimum braking action on the one hand, and with a minimum of wear or change in the braking interfaces themselves.

It has been found that cork and a high molecular weight polymer material including solid ethylene polymers and high molecular weight polyamides, such as nylon, afford an excellent braking couple, and materials of this class have been embodied successfully in brake means for use in connection with electric motors, particularly small induction motors of the fractional horsepower variety, one form of which is described hereinafter, in view of the annexed drawing, in which.

Figure 3A:
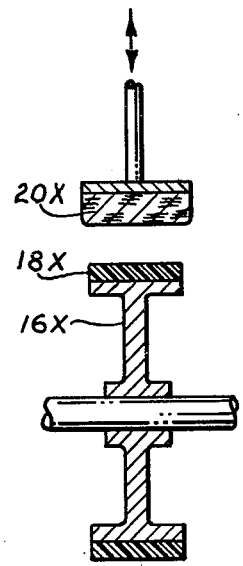
Figure 3B:
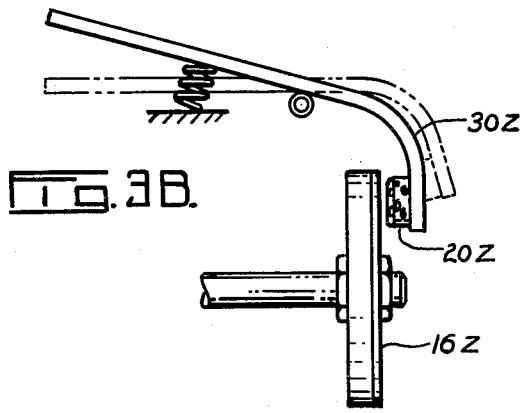

Figs. 3–A and 3–B are schematic diagrams of the braking couple in different forms of braking system.

Figure 1:
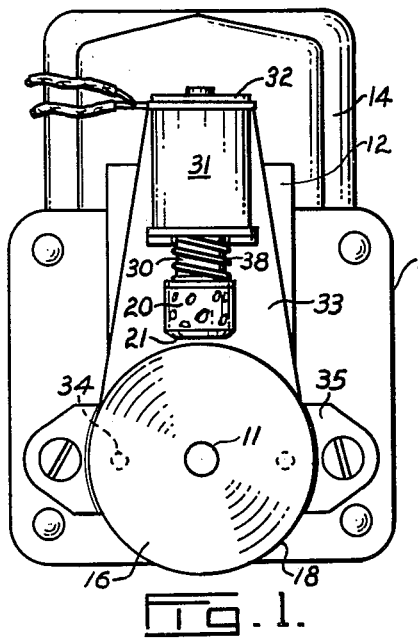
Fig. 1 is a front elevation of a fractional horsepower induction motor equipped with the new brake.

In Fig. 1 of the drawing the brake is shown applied to a small induction motor of the fractional horsepower variety including the usual laminated field frame or stator 10, a squirrel cage type rotor (not seen) rotating a motor shaft 11, and an energizing coil or winding 12.

Figure 2:
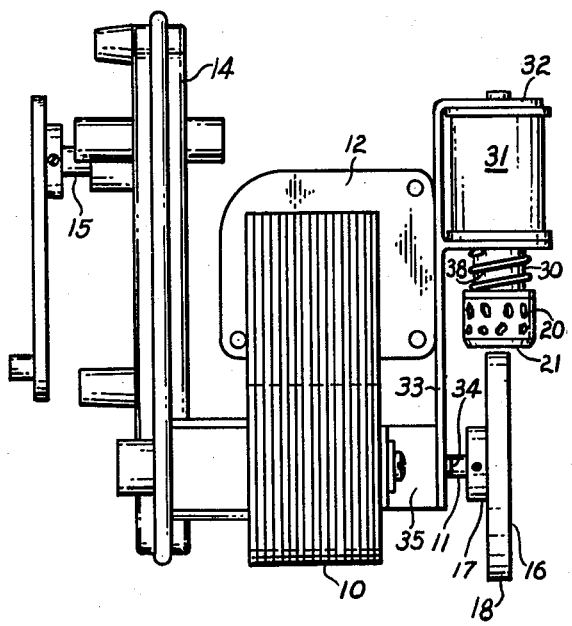
Fig. 2 is a side view of the motor of Fig. 1.

As seen in Fig. 2, this motor is also equipped with a reduction gear unit 14 having an output shaft 15 to which the working load would be applied in this case.

The motor shaft 11 is extended sufficiently to engage one of the brake members 16 in the preferred form of a disc having a hub 17 bored for tight press fit with shaft 11.

This first brake member 16 is preferably molded from a synthetic plastic material of the class known generically as nylon. This material has a very low coefficient of friction, low hardness, such as will be found amongst the long-chain synthetic polymers having high molecular weight, including particularly the linear fiber-forming polyamides (capable of yielding filaments on extrusion) known generically as "nylon." Polymers such as mentioned in Patent No. 2,153,553 may be used. So, also, may polyamide materials such as described in Patents 2,071,253 and 2,130,948.

The brake disc 16 has a substantial braking surface of this material exposed on a widened rim portion 18 thereof.

In the preferred construction shown, there is a second brake member 20 in the form of a cylindrical plug, of which at least one braking surface 21 is made of cork and confronts the complementary braking surface on rim 18 for engagement therewith.

In practice, the entire plug can be conveniently made of cork and is attached to the end of a solenoid plunger 30.

The plunger 30 is mounted for reciprocation in the bore of a solenoid winding 31 carried on a bracket 32 in turn affixed to a motor bracket 33 which is securred by rivets 34 to a part of the motor such as the bearing bracket 35.

A spring 38 on the solenoid plunger normally urges the second brake member or cork plug 20 into braking engagement with the braking surface, e.g. the rim 18 of the first brake member 16, so long as the coil 31 remains deenergized.

This brake-controlling coil is situated close to the motor coil 12 so as to be conveniently connected (not shown) in parallel with the latter in order that the two coils will be simultaneously energized with a resultant release of the brake (by attraction of plunger 30 and withdrawal of the cork plug 20) simultaneously with starting of the motor. Should there be a power failure or intended stoppage of the motor, the brake would be automatically applied by action of spring 38.

A braking combination or couple formed by cork and nylon has proved excellent in the motor applications of the type described for illustrative purposes, especially with respect to the braking action and the durability of the braking surfaces against wear. Even after long and abusive braking action, no significant wear or change will usually be detectable on the cork member; and no change at all appears on the nylon member, so that in the present state of experience and knowledge, this braking couple is capable of rendering good action and service over an indefinitely long period of time.

Two types of braking system are illustrated schematically in Figs. 3–A and 3–B, the former being of the class employed in the construction of Figs. 1 and 2, wherein the cork-faced member 20X is moved radially into and out of engagement with the peripheral nylon facing 18X on the rim of a wheel 16X.

In the system of Fig. 3–B the cork facing 20Z is carried on a rockable member 30Z for movement of its total face area into engagement with the relatively larger surface area of nylon on the axial end of the rotatable member 16Z.

In its broader aspects the invention provides an improved braking couple consisting of a braking surface of a lightweight compressible material, such as cork, and a complementary braking surface of a long chain, high molecular weight polymer, such as nylon, and no limitations are intended hereby as to any particular form or mode of operation of the brake or its application or combination with any particular kind or form of motor, except as may be required by the appended claims, the described embodiments being intended for illustrative purposes.

I claim:

1. In a brake mechanism, coacting braking members one of which has a braking surface consisting of a synthetic, long-chain linear polymer material, and another of which has a braking surface of a soft cellular material such as cork.

2. In a brake, coacting members engageable for braking action, one of said members having a braking surface consisting of a substantial area of a solid long-chain polymer of the class including the solid ethylene polymers and polyamides of high molecular weight, and the other of said members having a cooperative braking surface including a substantial area of a soft, lightweight compressible material of the class of cork.

3. In a brake for motors having a rotated shaft: first and second cooperative braking members, one of which includes a braking surface presenting a substantial area of a soft, lightweight material comprising essentially cork, and the other of which includes a cooperative braking surface presenting a substantial area of a synthetic high-molecular-weight polymer material such as nylon; a first one of said members having positive driving connection for angular acceleration and deceleration in step with the motor shaft, and a second one of said members being mounted for movement relative to the first member to press its braking surface into and out of braking engagement with the braking surface of the first said member.

4. In combination with a motor having a rotated shaft, a first brake member mounted for rotation by said shaft and having a nylon braking surface; a second brake member having a cork braking surface, and means movably mounting one of said brake members adjacent the other for motion into and out of braking engagement at the respective braking surfaces thereof.

5. In an electric motor having a rotatable shaft, brake means comprising a disc of a synthetic plastic polymer of the class of nylon fixed on the motor shaft for rotation therewith, a brake member made of cork; and means movably mounting said brake member adjacent said disc for movement into and out of contact against a rotated surface portion thereof together with means for moving said last-mentioned brake member as set forth.

References Cited in the file of this patent

UNITED STATES PATENTS

| | | |
|---|---|---|
| 758,140 | Ihlder | Apr. 26, 1904 |
| 1,082,834 | Whitcomb | Dec. 30, 1913 |
| 1,501,600 | Hartford | July 15, 1924 |
| 1,850,563 | Norton | Mar. 22, 1932 |
| 2,785,710 | Mowery | Mar. 19, 1957 |